June 3, 1941.　　　　W. H. MILLER　　　　2,244,427
METHOD OF MAKING FASTENING DEVICES
Original Filed Aug. 18, 1938　　2 Sheets-Sheet 1
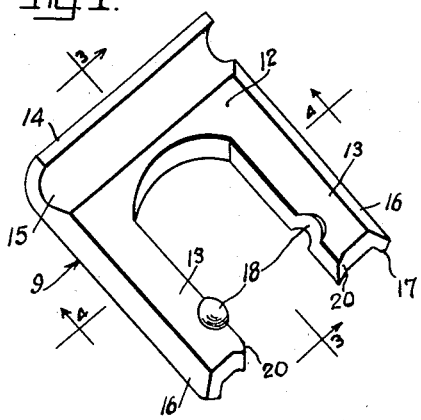
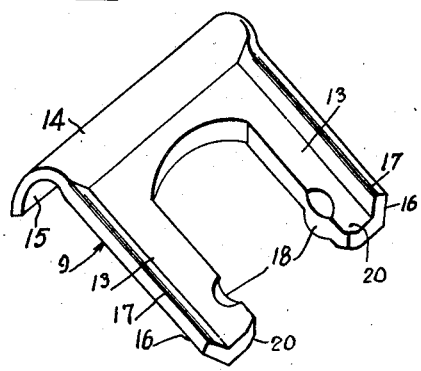
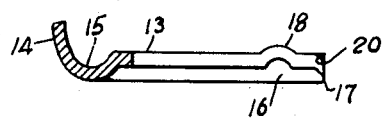
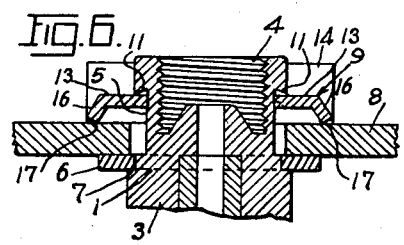
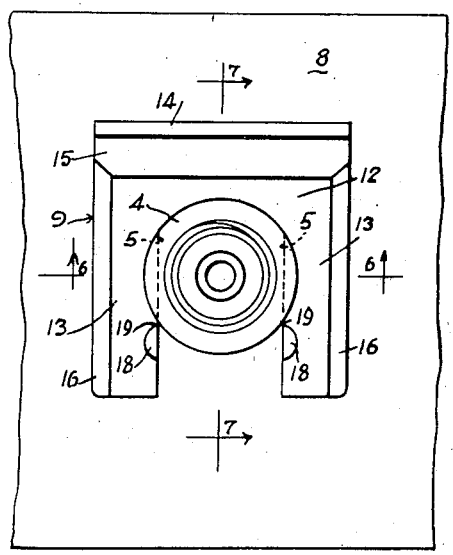
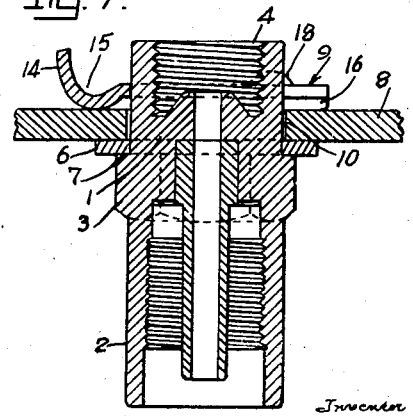
William H. Miller,

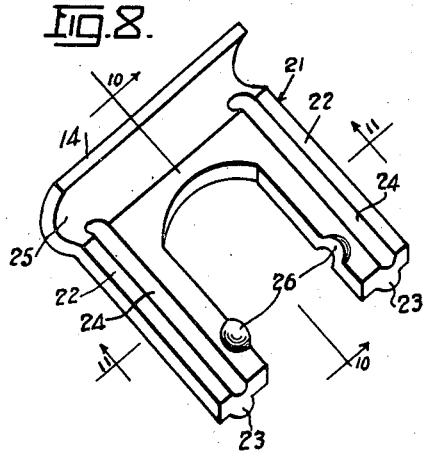
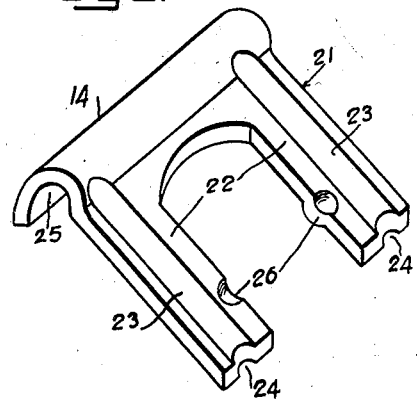
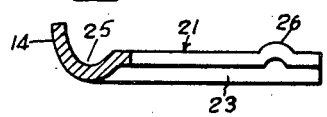
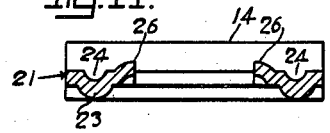
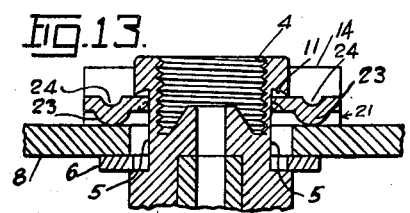
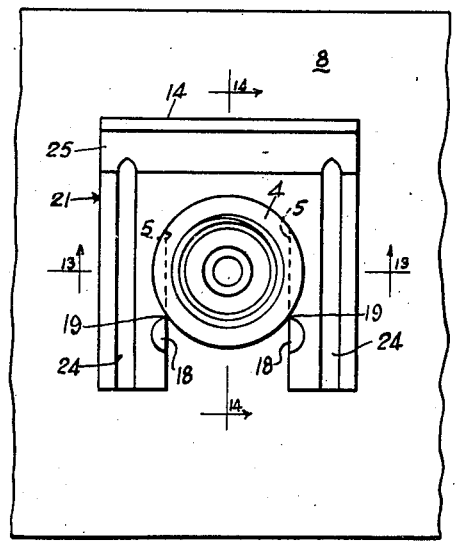
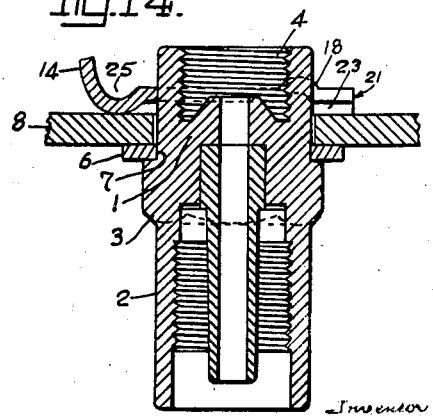

Patented June 3, 1941

2,244,427

UNITED STATES PATENT OFFICE 2,244,427

METHOD OF MAKING FASTENING DEVICES

William H. Miller, Royal Oak, Mich., assignor to The Flex-O-Tube Company, Detroit, Mich., a corporation of Delaware Original application August 18, 1938, Serial No. 225,593, now Patent No. 2,228,176, dated January 7, 1941. Divided and this application September 11, 1939, Serial No. 294,299

2 Claims. (Cl. 29—148)

This invention relates to devices for attaching members to supports.

The invention relates more particularly to the fastening device itself for detachably securing pipes or the like conduits, such as commonly employed for conveying hydraulic brake fluid in a braking system, to a rigid support, for instance a wall, panel, bracket, or other attaching element. It will be understood, however, that the invention is not limited to the attachment of brake tubing and hose conduits, but may be used for fastening various members, both solid and tubular, to a suitable support.

Metal tubing, such as copper, bronze, aluminum, lead, tin, etc., is employed in the construction and equipment of various types of machinery, for instance automotive, aeronautical and locomotive, for conveying oil, gasoline, water and hydraulic brake fluid from a supply source to different parts of the machine. In this connection it has been found desirable in practically all instances to limit the lengths of the metal tubing because during operation of the machine the tubing is subjected to vibration, bending stresses and whipping action, which accelerate the ultimate cracking and failure of the pipe or conduit. This necessitates that the tubing be rigidly supported at intervals along its length. Further it is common practice to incorporate in machinery of this type conduits which comprise sections of flexible hose and metal tubing which are connected together by separable couplings. The couplings require a support to prevent undue load or stress being exerted on the tubing in order to prolong its life.

In the construction of the machines comprising the aforementioned conduits, it is customary to provide a bracket or panel member upon which the coupling or tubing section may be mounted and firmly supported. It has also been found desirable to construct the supporting means so that it may be readily detached from the tubing or coupling when replacement or repair of the same is needed.

The principal object of this invention is to provide a novel fastener which affords an economical and highly efficient means for detachably mounting the tubing or coupling upon a bracket or supporting element of the machine.

Another object is to provide an efficient fastener for rigidly maintaining the tubing firmly and which may be readily removed and replaced without substantially marring or injuring the face of the bracket or panel upon which the tubing or coupling is supported.

Another object is to provide a fastener which is of rigid construction and which functions as a wedge for holding the tubing and adjacent parts securely together at all times.

Another object is to provide a novel fastener which is of reinforced construction which is not readily distorted in use, and is substantially inflexible.

Other objects and advantages of this invention will be apparent to those skilled in the art during the course of the following description.

This application is a division of my co-pending application Serial No. 225,593, filed August 18, 1938, now Patent 2,228,176, dated Jan. 7, 1941.

The preferred embodiments and modifications of this invention are illustrated in the accompanying drawings, wherein:

Figure 1 is a perspective view of one form of the fastening device of this invention;

Figure 2 is a perspective view of the reverse side of the fastener;

Figure 3 is a sectional view thereof taken along the line 3—3 of Figure 1;

Figure 4 is a sectional view taken along the line 4—4 of Figure 1;

Figure 5 is a front elevation view of the assembled fastener and tubular coupling maintained thereby;

Figure 6 is a sectional view taken on the line 6—6 of Figure 5, looking in the direction of the arrows;

Figure 7 is a similar sectional view taken along the line 7—7 of Figure 5;

Figure 8 is a perspective view of another form of the fastener device of this invention;

Figure 9 is a perspective view of the reverse side of the device shown in Figure 8;

Figure 10 is a sectional view thereof taken along the line 10—10 of Figure 8;

Figure 11 is a sectional view thereof taken along the line 11—11 of Figure 8;

Figure 12 is a front elevation view of the assembled fastener shown in Figure 8 and a tubular coupling maintained thereby;

Figure 13 is a sectional view taken along the line 13—13 of Figure 12, looking in the direction of the arrows;

Figure 14 is a sectional view taken along the line 14—14 of Figure 12, looking in the direction of the arrows.

Referring to the drawings in detail:

Figures 1 to 7 illustrate one form of the fastener for securing a tube or pipe coupling. Figures 8 to 14 show another form or modification of the fastener constructed according to this invention when employed in connection with detachably supporting pipe couplings similar to that shown in the foregoing Figures 5, 6 and 7. The use of the fastener device of this invention, as illustrated in Figures 5, 6 and 7 and 12, 13 and 14, is merely illustrative of one aspect of this invention and it will be obvious that the fastener is adapted for use in connection with detachably supporting conduits at spaced intervals therealong irrespective of whether a coupling is used.

The coupling shown in the drawings is of the conventional compression pipe type and comprises a body portion 1 having an elongated internally threaded end portion 2 for affording connection to a flexible conduit, not shown, and a central hexagonal section 3 applicable for accommodating a wrench. The opposite end of the coupling body comprises a threaded nipple 4 which is adapted to receive and provide a fluid tight connection with the pipe section attached thereto.

Referring to Figures 6 and 7, the nipple 4 is provided with external grooves 5 formed transversely of the axis of the tubing and on diametrically opposite sides thereof. The grooves 5 may extend from the hexagonal portion 3 along the pipe or be spaced therefrom. On the nipple 4 and abutting against the hexagonal section 3 is a washer 6 which is preferably driven or "force fit" upon the shoulder 7 to provide a collar or backing for the bracket plate or panel 8.

The tubing or coupling is rigidly held against the bracket 8 by the novel readily removable fastener 9 with which this invention is particularly concerned. The pipe coupling nipple 4 extends through an aperture 10 in the bracket 8 which may be of any desired shape and arranged to accommodate the end of the nipple of the tubing and presents a smaller opening than the outside diameter of the washer 6 in order to be retained thereagainst. In some instances the collar 6 may be omitted where the hexagonal portion 3 is of sufficient diameter to provide ample backing support for the bracket 8.

The grooves 5 on the nipple 4 are of such depth and length with respect to the thickness of the pipe wall and bracket that when the parts are assembled as illustrated in Figures 5, 6, 12 and 13, there will be just sufficient space provided for forcibly wedging the fastening member in place between the bracket and under-cut groove wall portions 11. It is preferable to undercut the grooves 5 as at 11, but it will be understood that this is optional and in some instances this undercutting may be omitted. Moreover the grooves 5 may comprise a single groove which extends all the way around the member 4 or a plurality of diametrically opposed grooves or cutaway portions may be provided therearound.

The construction of the fastener device 9 is illustrated in Figures 1 to 4 and comprises a U-shaped rigid or substantially inflexible member having a flat smooth face 12 for engaging with the member to be fastened to the support. The spaced angle leg members 13 form the sides of the device. The upper edge of the closed end consists of an upturned flange member 14. The base of the flange is depressed away from the surface plane of the angle members 13 forming a furrow or groove 15 which extends transversely across the top facing of the fastener. This flange affords a suitable means whereby the fastener can be readily seized by a tool or similar instrument and inserted into place or removed therefrom.

The angle leg extensions 13 have outer flange portions 16 which are shorter than the main leg extensions 13 and are turned down substantially at right angles thereto. The transverse grooves 15 and angular leg extensions produce a fastener which is thoroughly reinforced against bending transversely or longitudinally about its axis. By reason of this reinforced construction, a highly improved fastener is produced which has not heretofore been devised. The under edges 17 lie flat against the brackets 8 and are rounded somewhat so as to afford a surface which will frictionally grip or adhere to the bracket, yet will not cut or substantially mar the surface thereof. This construction is important where it is desired to insert the fastener on the front side of a panel or bracket and where the marring of the surface would be objectionable.

The upper surface of the leg members 13 is substantially flat and lies in the same plane, except for the raised knobs 18 which are adapted to engage over the outermost wall portions of the grooves 5, as at 19 in Figures 5 and 12, for locking the fastener in place. The inner corners of the legs 13 may be rounded and turned slightly downward, as at 20, to facilitate the insertion of the fastener. As an alternative the outer ends of the leg members along the edge may be flattened somewhat and turned upwards to enable the fastener to be more easily started into the grooves.

It will be obvious that the aperture formed by the leg members 13 and the upper flange base portion 15 may be varied to accommodate the particular member which is to be secured to the panel or bracket support.

The fastener 21 illustrated in Figures 8 to 11 is of rigid U-shaped construction, similar to that shown in Figures 1 to 6. In this instance the spaced leg members 22 are essentially flat rectangular flange elements having a bead or ridge 23 extending centrally along the back side of the members parallel to their longitudinal axis. Opposite the bead and on the front side are corresponding grooves or channels 24 as more fully shown in Figures 8 and 9.

The plane across the surface of the beads 23 coincides with that of the upper flange portion 25, as illustrated in Figure 11, so that the back side of the fastener will lie flat against the bracket 8 when employed for fastening the coupling to the supporting plate member. The inner extremities of the leg members 22 are provided with knobs or raised lugs 26 for locking the fastener in place, likewise as heretofore mentioned in the description of the fastener shown in Figures 1 to 4. The construction of the fastener as illustrated in Figures 8 to 11 produces an inflexible, rigid, reinforced fastener, likewise as that shown in Figure 1, which may be removed and replaced many times without undue wear or loss of its efficiency as a fastener.

It will be appreciated, of course, that this invention is not limited to the exact details of construction and use, since obvious modifications within the scope of this invention may be made by persons skilled in the art without departing from the spirit or scope of the claims appended hereto.

Having thus fully described my invention, what I claim as new and desire to secure by Letters Patent is:

1. A method of making a rigid fastening device for machine elements, comprising the steps of (a) cutting a U-shaped member from a metal sheet, (b) bending the leg portions of said member to provide a longitudinal strengthening rib on said leg portions to add rigidity against transverse bending thereto, (c) flanging the closed end of said U-shaped member to add rigidity against longitudinal bending to provide a fastening device reinforced against flexing along its transverse and longitudinal axes, and (d) pressing a protrusion in each of the leg portions adjacent the ends thereof for locking the fastening device upon the machine elements.

2. A method of constructing a rigid fastening device for securing machine elements together comprising cutting a U-shaped member from a metal sheet, bending the leg portions of the member to provide a longitudinal rib thereon for strengthening the same against transverse bending, bending the closed end of the member at substantially a right angle to the rib on the leg portions to provide a grooved portion which prevents longitudinal bending of the member, and of pressing raised knob portions in the inner edges of the leg portions for locking the device upon machine elements.

WILLIAM H. MILLER.